(12) United States Patent
Liu et al.

(10) Patent No.: US 10,823,628 B2
(45) Date of Patent: Nov. 3, 2020

(54) TORSION AND FORCE SENSING DEVICE AND ELECTRIC SCREWDRIVER UTILIZING SAME

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Eddy Liu, New Taipei (TW); Po-Lin Su, New Taipei (TW); Jie-Peng Kang, Zhengzhou (CN); Xue-Rui Deng, Zhengzhou (CN); Liu-Ming Zhang, Zhengzhou (CN); Wei-Wei Hao, Zhengzhou (CN); Su-Min Li, Zhengzhou (CN); Guang-Xing Wang, Zhengzhou (CN); Rui Li, Zhengzhou (CN); Jie Lai, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 16 days.

(21) Appl. No.: 16/352,196

(22) Filed: Mar. 13, 2019

(65) Prior Publication Data
US 2020/0209081 A1  Jul. 2, 2020

(30) Foreign Application Priority Data
Jan. 2, 2019 (CN) .......................... 2019 1 0001579

(51) Int. Cl.
G01L 3/14 (2006.01)
B25B 23/147 (2006.01)
G01L 1/04 (2006.01)

(52) U.S. Cl.
CPC .............. G01L 3/14 (2013.01); B25B 23/147 (2013.01); G01L 1/048 (2013.01)

(58) Field of Classification Search
CPC ..... G01L 1/04; G01L 3/00; G01L 3/14; G01L 1/048; B25B 23/147
USPC .................................................... 73/862.321
See application file for complete search history.

(56) References Cited

U.S. PATENT DOCUMENTS 4,094,192 A * 6/1978 Watson ................... G01L 5/161
 338/2
4,196,337 A * 4/1980 Jewett ................... G01L 3/1457
 219/121.35
5,063,788 A * 11/1991 Ch'Hayder ............. G01L 5/161
 73/862.043

(Continued)

*Primary Examiner* — Octavia Hollington
(74) *Attorney, Agent, or Firm* — ScienBiziP, P.C.

(57) ABSTRACT

A device to sense degree of twist in a screwdriver and the magnitude of force applied includes a contacting portion, a deformation portion, a sensing portion, and a processor. The contacting portion receives a grip and twist pressure through the deformation portion which is tiltedly fixed to the contacting portion. The deformation portion carries the sensing portion and elastically deforms under the force and/or the torsion. The sensing portion detects a deformation of the deformation portion and generates a corresponding electrical signal. The processor receives the signal and determines the values of the twist caused and the force applied.

20 Claims, 9 Drawing Sheets

(56) References Cited

U.S. PATENT DOCUMENTS

| | | | | |
|---|---|---|---|---|
| 7,437,954 | B2* | 10/2008 | Sakano | G01L 5/161 |
| | | | | 73/862.043 |
| 8,161,828 | B1* | 4/2012 | Clegg | G01L 3/1457 |
| | | | | 73/862.08 |
| 10,048,145 | B2* | 8/2018 | Janik | G01L 3/08 |
| 10,436,654 | B2* | 10/2019 | Su | G01L 1/2206 |
| 10,620,067 | B2* | 4/2020 | Doll | H05K 1/148 |
| 2015/0308883 | A1* | 10/2015 | Ziebart | G01G 3/1408 |
| | | | | 177/132 |

* cited by examiner

TORSION AND FORCE SENSING DEVICE AND ELECTRIC SCREWDRIVER UTILIZING SAME

FIELD

The subject matter herein generally relates to mechanical control devices.

BACKGROUND

Torque sensors, also known as torsion sensors, can be set on various mechanical components, and used to detect degree of being twisted. In practical applications of torque sensor, users often need to know the magnitude of a twisting force as well as the resulting degree of twist. This can be done by setting up additional sensors. However, increasing in the number of components not only increases the volume of mechanical components, resulting in operational inconvenience, but also increases the cost of hardware.

Therefore, there is room for improvement within the art.

BRIEF DESCRIPTION OF THE DRAWINGS

Implementations of the present technology will now be described, by way of embodiments only, with reference to the attached figures.

DETAILED DESCRIPTION

Figure 1:
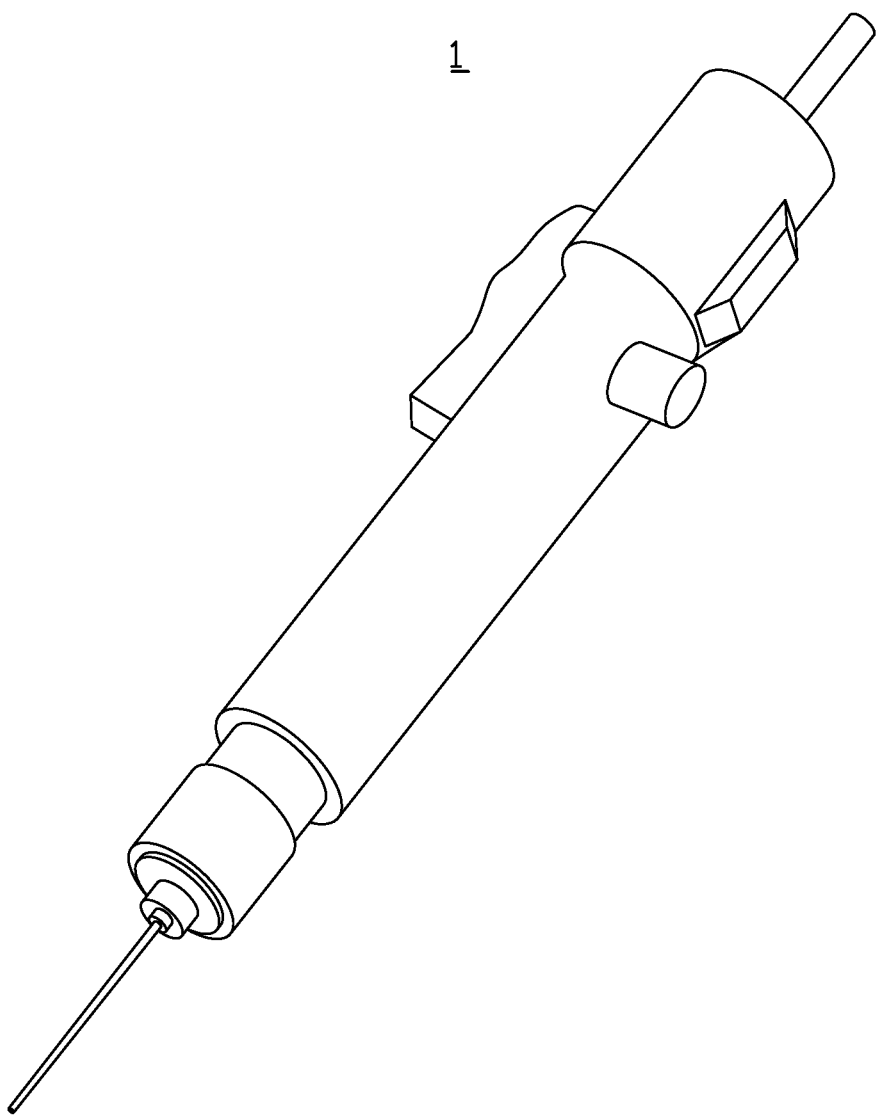
FIG. 1 is an isometric view of an electronic screwdriver in accordance with one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Figure 2:
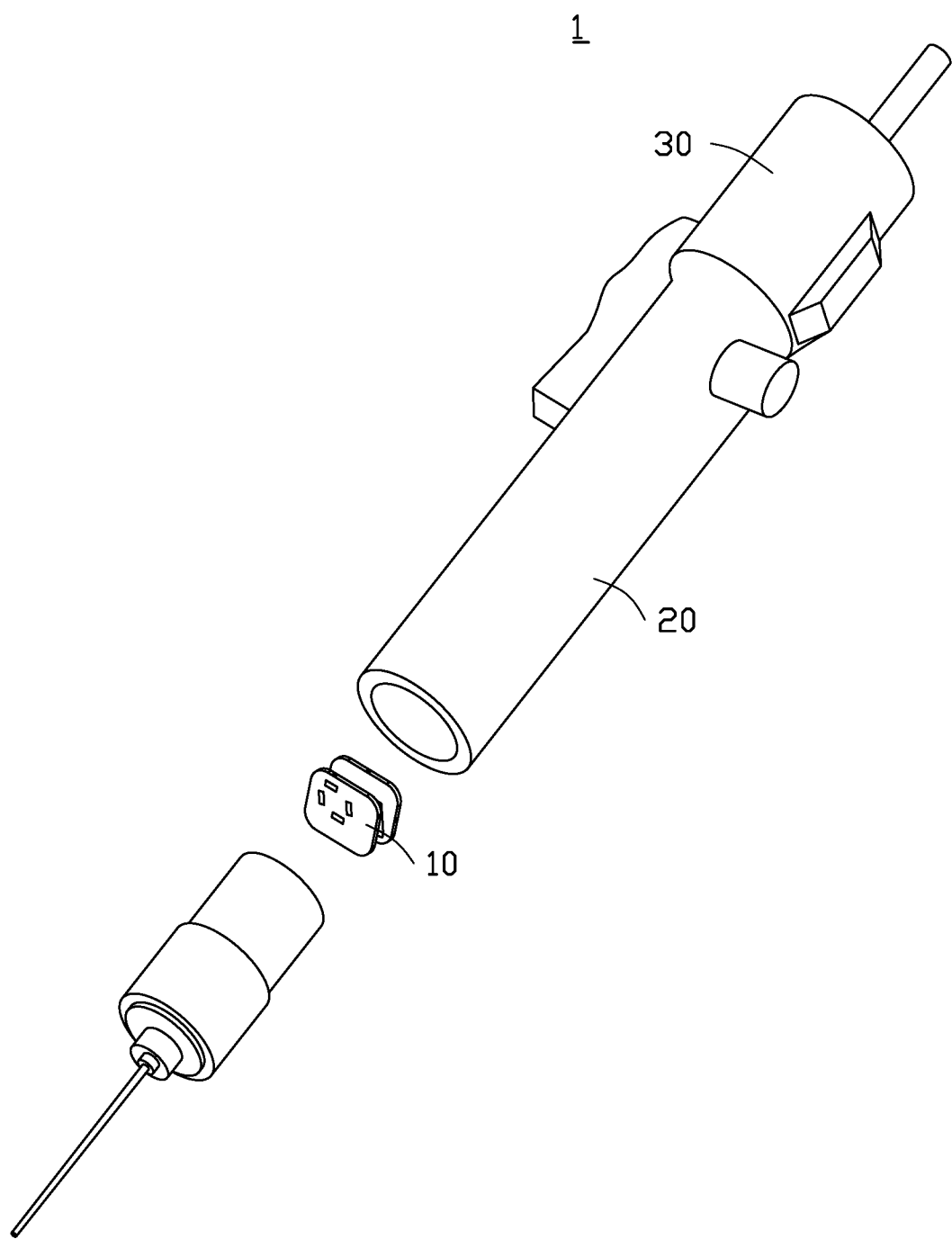
FIG. 2 is an exploded view of the screwdriver of FIG. 1 including a torsion and force sensing device.
Figure 3:
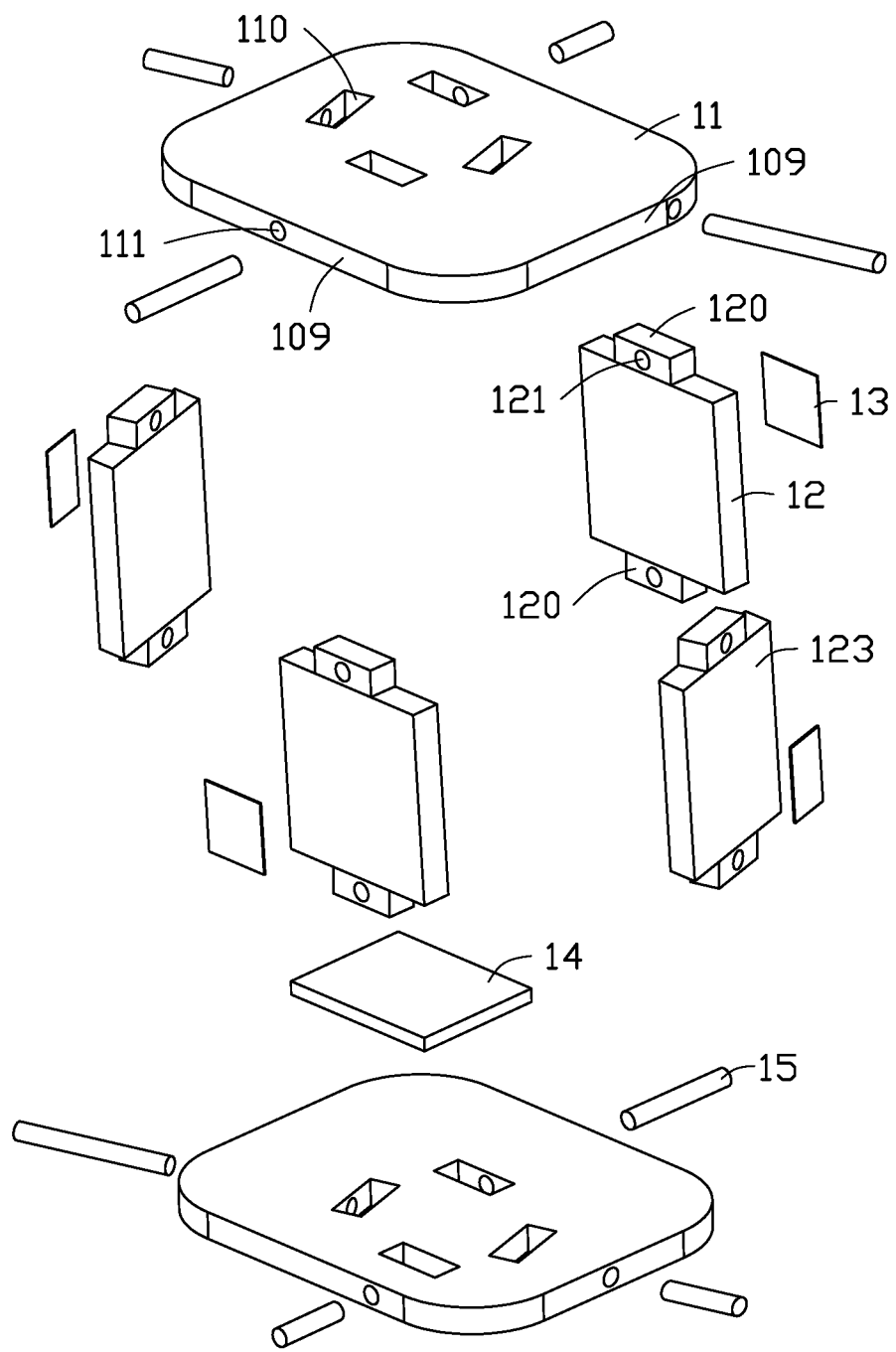
FIG. 3 is an exploded view of the torsion and force sensing device in FIG. 2.
Figure 4:
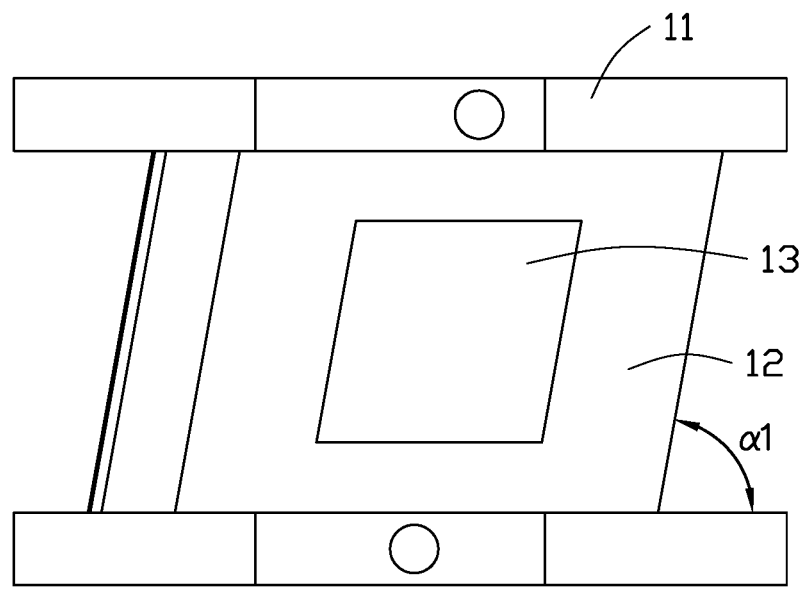
FIG. 4 is a side view of the device in FIG. 3.
Figure 5:
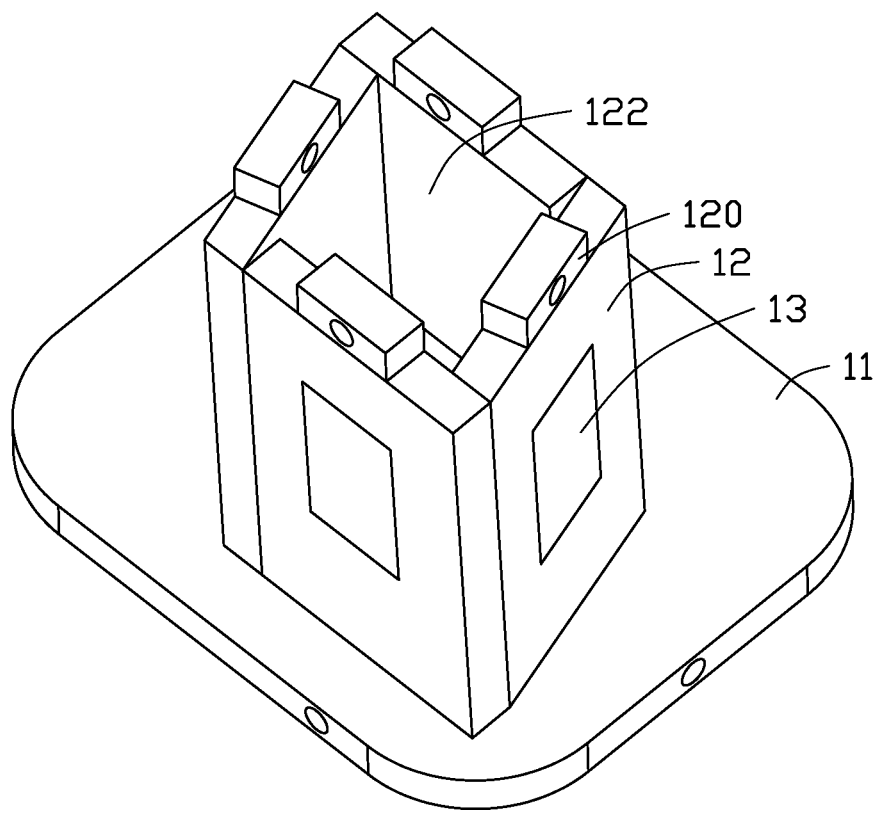
FIG. 5 is an isometric view of the device of FIG. 3 with one contacting portion removed.

FIGS. 1-2 illustrate an electronic screwdriver 1. The electric screwdriver 1 includes at least a combination device for detecting torsion and force applied on an object and a housing 20. The combination device is a torsion and force sensing device 10 and the torsion and force sensing device 10 is installed in the housing 20. The torsion and force sensing device 10 senses a degree of torque and a force being applied to a target object by the electric screwdriver 1 when the electric screwdriver 1 is operated. The target object may be a screw, for example.

Figure 7:
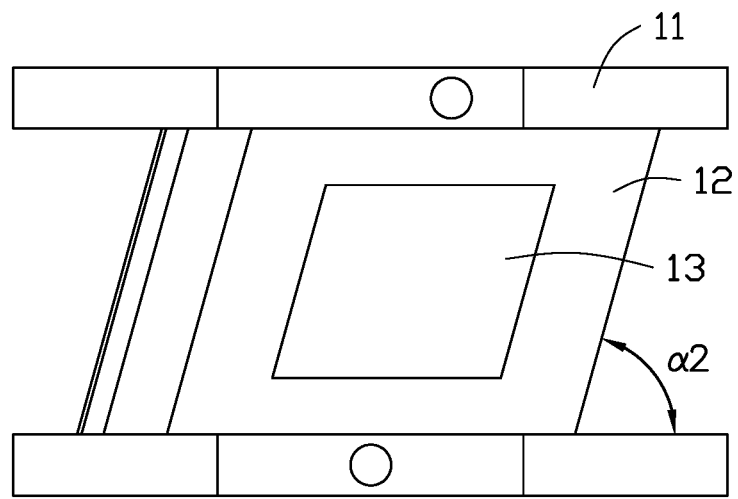
FIG. 7 is a first side view of the device of FIG. 3 in accordance with one embodiment.
Figure 8:
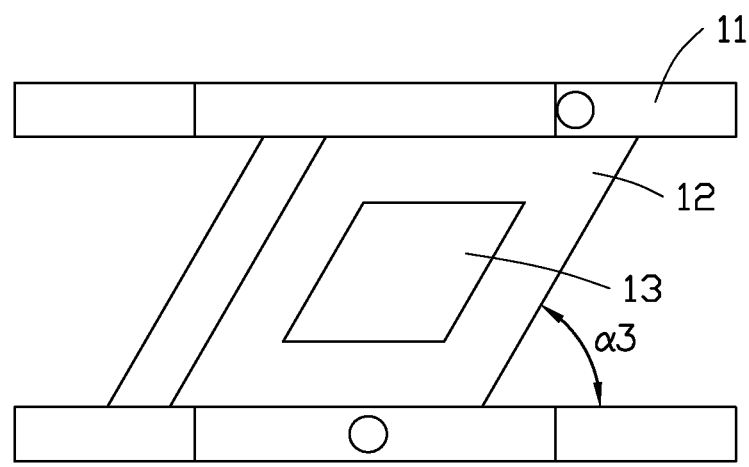
FIG. 8 is a second side view of the device of FIG. 3 in accordance with one embodiment.
Figure 9:
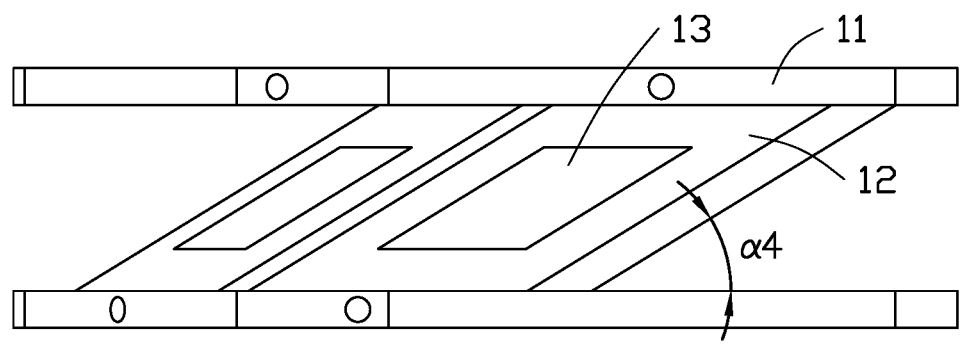
FIG. 9 is a third side view of the device of FIG. 3 in accordance with one embodiment.

As shown in FIG. 3 to FIG. 6, the torsion and force sensing device 10 includes a contacting portion 11, a deformation portion 12, a sensing portion 13, and a processor 14. The deformation portion 12 is fixed to the contacting portion 11 but not at a right angle to the contacting portion 11 (it is tilted to a tilt angle). In the embodiment, the tilt angle α between the contacting portion 11 and the deformation portion 12 is in a range from 45 degrees to 90 degrees, such as $\alpha_4$ being 45 degrees (shown in FIG. 9), or $\alpha_3$ being 60 degrees (shown in FIG. 8), or $\alpha_2$ being 75 degrees (shown in FIG. 7) or $\alpha_1$ being 80 degrees (shown in FIG. 4). The sensing portion 13 is placed on the deformation portion 12 and electrically connected to the processor 14. The deformation portion 12 is elastic. The contacting portion 11 can drive the deformation portion 12 to deform when pressed and/or twisted. The sensing portion 13 detects a deformation of the deformation portion 12 and generates a corresponding electrical signal. The processor 14 determines the degree of twist and a magnitude of force applied on an object based on the electrical signal.

In the embodiment, the torsion and force sensing device 10 includes two contacting portions 11 and four deformation portions 12. The two contacting portions 11 face toward each other and are spaced a preset distance apart. Preferably, the preset distance is about 21 mm. The contacting portion 11 is made of a metal alloy material, such as an aluminum alloy. The deformation portion 12 is made of a stainless steel elastic steel material. The four deformation portions 12 are fixed between the two contacting portions 11.

Specifically, the contacting portion 11 is substantially a plate body and includes four side surfaces 109 connected sequentially. The contacting portion 11 is provided with four receiving holes 110 passing through the plate body, and each side surface 109 is provided with a first pin hole 111. Each first pin hole 111 communicates with a receiving hole 110. Each receiving hole 110 corresponds to a side surface 109 of the contacting portion 11. The deformation portion 12 projects at opposite ends to form a projecting portion 120. The projecting portions 120 at opposite ends of each deformation portion 12 extend in a direction opposite to each other. The projecting portions 120 at the ends are not coplanar with the middle main portion of the deformation portion 12. This ensures safety and damage-avoidance of the deformation portion 12 when force is applied on the contacting portion 11. Each projecting portion 120 is provided with a second pin hole 121. The projecting portion 120 is matched with the receiving holes 110 and accommodated in the receiving hole 110, and each second pin hole 121 is aligned with each first pin hole 111. Further, the torsion and force sensing device 10 further includes eight pins 15, each pin 15 passes through a group of the first pin holes 111 and the second pin holes 121, so that the two contacting portions 11 and the four deformation portions 12 are fixed to each other, and the two contacting portions 11 and the four deformation portions 12 create an enclosure forming a cavity 122.

In the embodiment, the torque and force sensing device 10 includes four sensing portions 13. The four sensing portions 13 are flake-like and are each attached to a side surface of a deformation portion 12. The portions 13 sense variations in shape corresponding to the deformation portion 12. The sensing portions 13 are located outside of the cavity 122.

In the embodiment, the sensing portion 13 is a strain gauge, and the strain gauge comprises a sensitive gate and a Wheelstone bridge, to measure strain. The strain gauge is tightly installed on a conducting or semiconducting material. When the conductor or semiconductor material is mechanically deformed by an external force, the resistance value measured by the Wheelstone bridge changes accordingly, thereby generating a corresponding electrical signal.

When one of the contacting portions 11 is pressed, the four deformation portions 12 are deformed in a direction perpendicular to the contacting portion 11. When one of the contacting portions 11 is twisted, the other deformation portions 12 are also twisted by the contacting portion 11. The sensing portion 13 is capable of detecting the deformation caused by the torsion of the deformation portion 12 and generating a torsion electric signal accordingly. When the contacting portion 11 is subjected to a gripping force and twisted at the same time, the sensing portion 13 is able to simultaneously detect a deformation generated by the deformation portion 12 in a direction perpendicular to the contacting portion 11 and a deformation parallel to the direction of the contacting portion 11. Thus, an electric signal as to force applied and a torsion electric signal are both generated.

In the embodiment, the processor 14 includes a signal processing circuit (not shown) arranged in the cavity 122 and electrically connected to the sensing portion 13.

Figure 6:
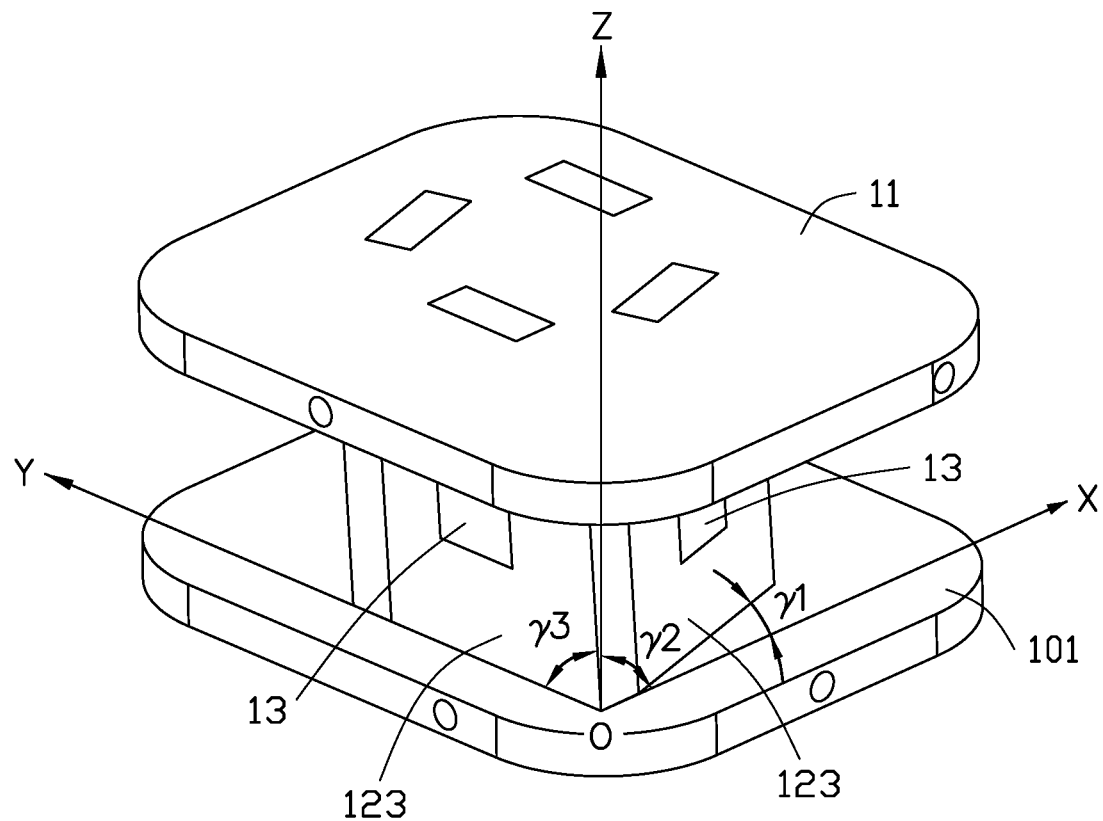
FIG. 6 is an isometric view of the device in FIG. 3.

As shown in FIG. 6, on a surface of the contacting portion 11, a direction along a short side of the contacting portion 11 defines an x-axis and a direction along the long side of the contacting portion 11 defines a y-axis. An intersection point between the x-axis and y-axis is an origin point, and a direction perpendicular to the x-axis and y-axis is defined as a z-axis. The x-axis and y-axis together define a bottom surface 101, the x axis and z-axis together define a first surface, and the y-axis and z-axis together define a second surface. A side surface 123 refers to surface with the sensing portion 13 of the deformation portion 12. An angle $\gamma_2$ is formed between the side surface 123 and the second surface, and an angle $\gamma_3$ is formed between the side surface 123 and the first surface. Angle $\gamma_1$ is formed between the side surface 123 and the bottom surface. That is, angles are formed between the deformation portion 12 with the sensing portion 13 and the x-axis, the y-axis and the z-axis, which improves the sensitivity of the deformation portion 12. Detection of deformation and degree thereof is thus easier when the force is applied, improving the accuracy of the sensing.

As shown in FIG. 2, the electric screwdriver 1 further includes a display unit 30. The display unit 30 is arranged on the housing 20 of the electric screwdriver 1 for displaying values of the degree of twist and the magnitude of the force applied. It is convenient for the user to adjust the torque and force applied to the target object according to the displayed values. In the embodiment, the display unit 30 is an LED display screen or an LCD display screen.

When the torque and force sensing device 10 is utilized by the electric screwdriver 1, the twist and the force applied to the target object may be detected when the electric screwdriver 1 is applied to the target object, and to control the object accurately.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A torsion and force sensing device comprising:
   a contacting portion to receive a force and/or a twist, wherein the contacting portion is substantially a plate body and comprises four side surfaces connected sequentially, the contacting portion defines four receiving holes extending through the plate body, and each of the four side surfaces defines a first pin hole;
   a deformation portion fixed to the contacting portion and tilted to the contacting portion with a preset angle, wherein the deformation portion generates an elastic deformation under the force and/or the twist;
   a sensing portion fixed on the deformation portion, the sensing portion being adapted for detecting a deformation variable of the deformation portion and generating a corresponding electrical signal; and
   a processor electrically connected to the sensing portion and determined values of twist and/or values of the force applied on the contacting portion based on the electrical signal.

2. The torsion and force sensing device of claim 1, wherein the torsion and force sensing device comprises two contacting portions, the two contacting portions face toward and space apart each other.

3. The torsion and force sensing device of claim 2, wherein the torsion and force sensing device comprises four deformation portions, and the four deformation portions are fixed between the two contacting portions.

4. The torsion and force sensing device of claim 3, wherein the four deformation portions are successively supported and enclosed to form a cavity.

5. The torsion and force sensing device of claim 4, wherein the contacting portion is made of a metal alloy material.

6. The torsion and force sensing device of claim 5, wherein the deformation portion is made of stainless steel material.

7. The torsion and force sensing device of claim 6, wherein a tilt angle between the contacting portion and the deformation portion is in a range from 45 degrees to 90 degrees.

8. The torsion and force sensing device of claim 7, wherein the torque and force sensing device comprises four sensing portions, each of the four sensing portions is attached to each side surface of a deformation portion and locates outside of the cavity.

9. The torsion and force sensing device of claim 8, wherein the sensing portion is a strain gauge.

10. The torsion and force sensing device of claim 9, wherein each of the first pin hole communicates with each of the receiving holes, and each of the receiving holes corresponds to each of the four side surfaces of the contacting portion.

11. The torsion and force sensing device of claim 10, wherein two opposite ends of the deformation portion project to form a projecting portion, a size of the projecting portion is matched with a size of the receiving holes and accommodated in the receiving hole, each projecting portion is provided with a second pin hole, and each of the second pin holes is aligned with each of the first pin holes.

12. The torsion and force sensing device of claim 11, wherein the projecting portions at opposite ends of each of the deformation portions extend in a direction opposite to each other, and the projecting portions at both ends is not coplanar with a middle portion between the projecting portions of the deformation portion.

13. The torsion and force sensing device of claim 12, wherein a direction extending along a short side of the contacting portion defines a x-axis, a direction of a long side of the contacting portion defines a y-axis, an intersection point between the x-axis and y-axis is an origin point, and a direction perpendicular to the x-axis and y-axis is defined as z-axis, x-axis and y-axis together define a bottom surface, x-axis and z-axis together defined a first surface, y-axis and z-axis together defined a second surface, an angle is formed between the side surface of the deformation portion and the second surface.

14. The torsion and force sensing device of claim 13, wherein an angle is formed between the side surface of the deformation portion and the first surface.

15. The torsion and force sensing device of claim 14, wherein an angle is formed between the side surface of the deformation portion and the bottom surface.

16. The torsion and force sensing device of claim 11, wherein the torsion and force sensing device further comprises eight pins, each of the eight pin passes through a group of the first pin hole and a second pin hole to fix the contacting portions and the deformation portion.

17. An electric screwdriver comprising:
a housing; and
a torsion and force sensing device received in the housing, wherein the torsion and force sensing device comprising:
a contacting portion to receive a force and/or a torsion;
a deformation portion fixed to the contacting portion and tilted to the contacting portion with a preset angle, wherein the deformation portion generates an elastic deformation under the force and/or the torsion;
a sensing portion fixed on the deformation portion, the sensing portion being adapted to detect a deformation variable of the deformation portion and generate a corresponding electrical signal; and
a processor electrically connected to the sensing portion and determined values of twist and/or values of the force applied on the contacting portion based on the electrical signal.

18. The electric screwdriver of claim 17, wherein further comprising a display unit fixed on the housing for displaying torque values and force values sensed by the torsion and force sensing device.

19. The electric screwdriver of claim 17, wherein the contacting portion is substantially a plate body and comprises four side surfaces connected sequentially, the contacting portion defines four receiving holes extending through the plate body, and each of the four side surfaces defines a first pin hole.

20. The electric screwdriver of claim 19, wherein each of the first pin hole communicates with each of the receiving holes, and each of the receiving holes corresponds to one of the four side surfaces of the contacting portion.

* * * * *